US012808746B2

(12) United States Patent
In et al.

(10) Patent No.: US 12,808,746 B2
(45) Date of Patent: Nov. 24, 2026

(54) CHARACTERISTIC MEASURING DEVICE

(71) Applicant: SAGINOMIYA SEISAKUSHO, INC., Tokyo (JP)

(72) Inventors: Eisei In, Sayama (JP); Kohei Hizono, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 305 days.

(21) Appl. No.: 18/711,919

(22) PCT Filed: Jul. 26, 2022

(86) PCT No.: PCT/JP2022/028774
§ 371 (c)(1),
(2) Date: May 21, 2024

(87) PCT Pub. No.: WO2023/095384
PCT Pub. Date: Jun. 1, 2023

(65) Prior Publication Data

US 2025/0020538 A1 Jan. 16, 2025

(30) Foreign Application Priority Data

Nov. 25, 2021 (JP) ................................ 2021-191587

(51) Int. Cl.
*G01M 7/04* (2006.01)
*G01M 7/02* (2006.01)

(52) U.S. Cl.
CPC .............. *G01M 7/04* (2013.01); *G01M 7/025* (2013.01)

(58) Field of Classification Search
CPC ...... G01M 7/022; G01M 7/025; G01M 7/027; G01M 7/04
(Continued)

(56) References Cited

U.S. PATENT DOCUMENTS 5,179,516 A * 1/1993 Choshitani ............ G01M 7/022 73/664
11,280,697 B2 * 3/2022 In .......................... G01M 7/025
2025/0067621 A1 * 2/2025 In ............................ G01M 7/04

FOREIGN PATENT DOCUMENTS

EP 2921842 B1 * 6/2020 ............... G01N 3/38
JP 2011112487 A 6/2011
(Continued)

OTHER PUBLICATIONS

JP 2024-194464, Notice of Reasons for Refusal, Jan. 19, 2026.

*Primary Examiner* — John Fitzgerald
(74) *Attorney, Agent, or Firm* — The Webb Law Firm

(57) ABSTRACT

To provide a characteristic measuring device capable of smoothly switching between a floating-mass state and a fixed state, while a predetermined pre-load is maintained. In a characteristic measuring device, a support part includes an air spring and a double fastening mechanism each arranged between a middle surface plate and a reaction-force section, the double fastening mechanism includes a first actuator fixed to the reaction-force section and a second actuator fixed to the middle surface plate, and the reaction-force section is not supported in the floating-mass state and is supported in the fixed state by the first actuator and the second actuator. In this way, a problem of the prior art (pre-load variation) is eliminated, and switching between the floating-mass state and the fixed state can be smoothly achieved.

5 Claims, 9 Drawing Sheets

(58) Field of Classification Search
USPC .............................................................. 73/633
See application file for complete search history.

(56) References Cited

FOREIGN PATENT DOCUMENTS

| | | | |
|---|---|---|---|
| JP | 2014006056 | A | 1/2014 |
| JP | 2020085528 | A | 6/2020 |

* cited by examiner

FLOATING-MASS STATE

TEMPORARY FIXED STATE

FIXED STATE

CHARACTERISTIC MEASURING DEVICE

CROSS-REFERENCE TO RELATED APPLICATIONS

This application is the United States national phase of International Application No. PCT/JP2022/028774 filed Jul. 26, 2022, and claims priority to Japanese Patent Application No. 2021-191587 filed Nov. 25, 2021, the disclosures of which are hereby incorporated by reference in their entireties.

BACKGROUND OF THE INVENTION

Field of the Invention

The present invention relates in particular to a characteristic measuring device that performs a measurement on a test specimen (for example, an anti-vibration rubber and an anti-vibration component) for applications such as for automobiles with a predetermined pre-load being applied to the test specimen for its dynamic characteristics, durability, and the like, under a high load condition.

Description of Related Art

In recent years, in addition to vehicles with a traditional gasoline engine, a hybrid-type vehicle and an electric vehicle that use rotating force of an electric motor (hereinafter referred to as "electric vehicle or the like") have rapidly become popular. The vibration range of the electric motor extends to a higher frequency range than the vibration range of a traditional reciprocating engine.

Generally, for a characteristic test performed on a test specimen for use in such an electric vehicle or the like, it is necessary to measure a load or the like caused by vibration (displacement or acceleration) input from outside while a predetermined load (hereinafter referred to as "pre-load") is being applied to the test specimen, assuming conditions of an actual vehicle.

For example, Patent Literature 1 (i.e., Japanese Patent Laid-Open No. 2014-006056, in particular, see FIGS. 2 and 6) describes a characteristic measuring device (hereinafter referred to as "prior-art characteristic measuring device"), which includes: a base part that includes a vibration generator; a measurement part that measures properties of a test specimen by a load detector; and a support part that is mounted on the base part and supports a reaction-force section that functions as a weight via an air spring and a fastening mechanism. In the characteristic measuring device, paired attachment jigs, which are fixed to the base part and the support part respectively, are used to clamp a test specimen in an up-down direction and, in this state, a process of adjusting the distance between the paired attachment jigs is performed to apply a predetermined pre-load to the test specimen prior to measurement, and characteristic values of the test specimen are measured while vibration is being applied to the test specimen by the vibration generator.

SUMMARY OF THE INVENTION

Technical Problem

As illustrated in FIGS. 5A and 5B, to accommodate a wide variety of vibration frequencies that are input by the vibration generator during a characteristic test, a support part 620 in the prior-art characteristic measuring device is required to be switched between a state in which a reaction-force section 624 is supported by an air spring 623 relative to a middle surface plate 622 (hereinafter referred to as "floating-mass state") (see FIG. 5A) and a state in which the reaction-force section 624 is fastened and fixed by a fastening mechanism 700 to the middle surface plate 622 (hereinafter referred to as "fixed state") (see FIG. 5B). In this way, the fixed state is entered when input vibration frequencies are on the order of approximately 100 to 150 Hz or less, and the floating-mass state is entered when the frequencies are up to on the order of 150 Hz to several kilohertz.

Specifically, the support part 620 in the prior-art characteristic measuring device includes the air spring 623, a stopper 625, and the fastening mechanism 700, which are in closed state, between the middle surface plate 622 and the reaction-force section 624. The fastening mechanism 700 includes an actuator 710 fixed to a lower surface of the reaction-force section 624 and a catch member 720 fixed to an upper surface of the middle surface plate 622. The actuator 710 includes a cylinder 711 fixed to the lower surface of the reaction-force section 624 and a movable section 712 that includes a lower large-diameter portion 712*a* and an upper large-diameter portion 712*b*. Here, the lower large-diameter portion 712*a* of the movable section 712 is capable of being caught by the catch member 720, while the upper large-diameter portion 712*b* of the movable section 712 is contained in the cylinder 711.

First, when a transition is to be made from the fixed state to the floating-mass state (from FIG. 5B to FIG. 5A), a drive oil is supplied into an upper closed space C1 defined by the cylinder 711 and an upper surface of the upper large-diameter portion 712*b*, so that the movable section 712 moves downward (see a black solid arrow A1 in FIG. 5A) and the lower large-diameter portion 712*a* and the catch member 720 are disengaged. This creates a restoring force in the compressed air spring 623 and the reaction-force section 624 moves upward (see a hollow arrow B1 in FIG. 5A).

Next, when a transition is to be made from the floating-mass state to the fixed state (from FIG. 5A to FIG. 5B), a drive oil is supplied into a lower closed space C2 defined by the cylinder 711 and a lower surface of the upper large-diameter portion 712*b*, so that the movable section 712 moves upward (see a black solid arrow A2 in FIG. 5B) and the lower large-diameter portion 712*a* is caught by the catch member 720. This allows the actuator 710 to cause the reaction-force section 624 to move downward until it abuts against the stopper 625, compressing the air spring 623 (see a hollow arrow B2 in FIG. 5B).

As can be seen, during switching between the floating-mass state and the fixed state, the height position of the reaction-force section 624 varies relative to the middle surface plate 622. In addition, in the fixed state (see FIG. 5B), since the air spring 623 is compressed further downward by the actuator 710, leakage of air or the like from the air spring 623 to the outside is more likely to occur than in the floating-mass state (see FIG. 5A). Consequently, positional variation of the reaction-force section 624 occurring during switching from the fixed state to the floating-mass state is not replicable, and the variation may not always be the same. Such positional variation of the reaction-force section 624 causes a variation in the distance between paired attachment jigs that apply a predetermined pre-load to the test specimen, resulting in a problem of causing a large variation in the pre-load to the test specimen (hereinafter referred to as "problem of the prior art (pre-load variation)").

To solve the problem of the prior art (pre-load variation), it is necessary to perform a process of adjusting the distance between paired attachment jigs that support the test specimen in the up-down direction every time switching occurs between the floating-mass state and the fixed state, which leads to a waste of time and is laborious.

An object of the present invention is to provide a characteristic measuring device capable of smoothly switch between the floating-mass state and the fixed state, while a predetermined pre-load is maintained.

Solution to Problem

To solve the problem described above, there is provided a characteristic measuring device, including: a base part; a support part mounted on an upper portion of the base part; and a measurement part arranged between the base part and the support part, with a test specimen being attached to the measurement part, wherein the support part includes: a middle surface plate fixed to the base part; a reaction-force section that functions as a weight; and an air spring and a double fastening mechanism each arranged between the middle surface plate and the reaction-force section, the air spring and the double fastening mechanism support the reaction-force section such that a height of the reaction-force section is not varied in both a floating-mass state and a fixed state to maintain a predetermined pre-load to the test specimen, and the double fastening mechanism includes: a first actuator fixed to the reaction-force section; and a second actuator fixed to the middle surface plate, and wherein the reaction-force section is not supported by the first actuator and the second actuator in the floating-mass state and supported by the first actuator and the second actuator in the fixed state.

The characteristic measuring device may be such that the first actuator includes a first movable section that is contactable with and separable from a lower surface of the reaction-force section, the second actuator includes a second movable section that passes through the reaction-force section and the first movable section, the second movable section including an engagement portion that is contactable with and separable from a lower end of the first movable section, and in the floating-mass state, an upper end and the lower end of the first movable section are spaced apart in an axial direction from the reaction-force section and the second movable section respectively, and in the fixed state, the upper end and the lower end of the first movable section are in abutment against the reaction-force section and the second movable section respectively.

The characteristic measuring device may be such that, in a temporary fixed state between the floating-mass state and the fixed state, the air spring and the double fastening mechanism support the reaction-force section such that the height of the reaction-force section is not varied, and the reaction-force section is supported by only the first actuator in the temporary fixed state.

The characteristic measuring device may be such that the first actuator includes a first movable section that is contactable with and separable from the lower surface of the reaction-force section, and the second actuator includes a second movable section that passes through the reaction-force section and the first movable section, the second movable section including an engagement portion that is contactable with and separable from the lower end of the first movable section, and in the temporary fixed state, by causing the upper end of the first movable section to abut against the reaction-force section and causing the lower end of the first movable section to be spaced apart from the second movable section, the reaction-force section is supported such that the height of the reaction-force section is not varied relative to the middle surface plate.

The characteristic measuring device may be such that it further includes a reaction-force-section height-holding means that includes a displacement detector configured to measure displacement of the reaction-force section at least in the floating-mass state, the reaction-force-section height-holding means being configured to control supply pressure to the air spring based on a displacement signal measured by the displacement detector.

Advantageous Effects of Invention

According to the present invention, a characteristic measuring device capable of smoothly switching between the floating-mass state and the fixed state, while a predetermined pre-load is maintained can be provided.

DESCRIPTION OF THE INVENTION

An embodiment of the present invention will be described in detail with reference to FIGS. 1A to 4. However, the present invention is not limited to aspects of the embodiment.

<Terminology>

Figure 1A:
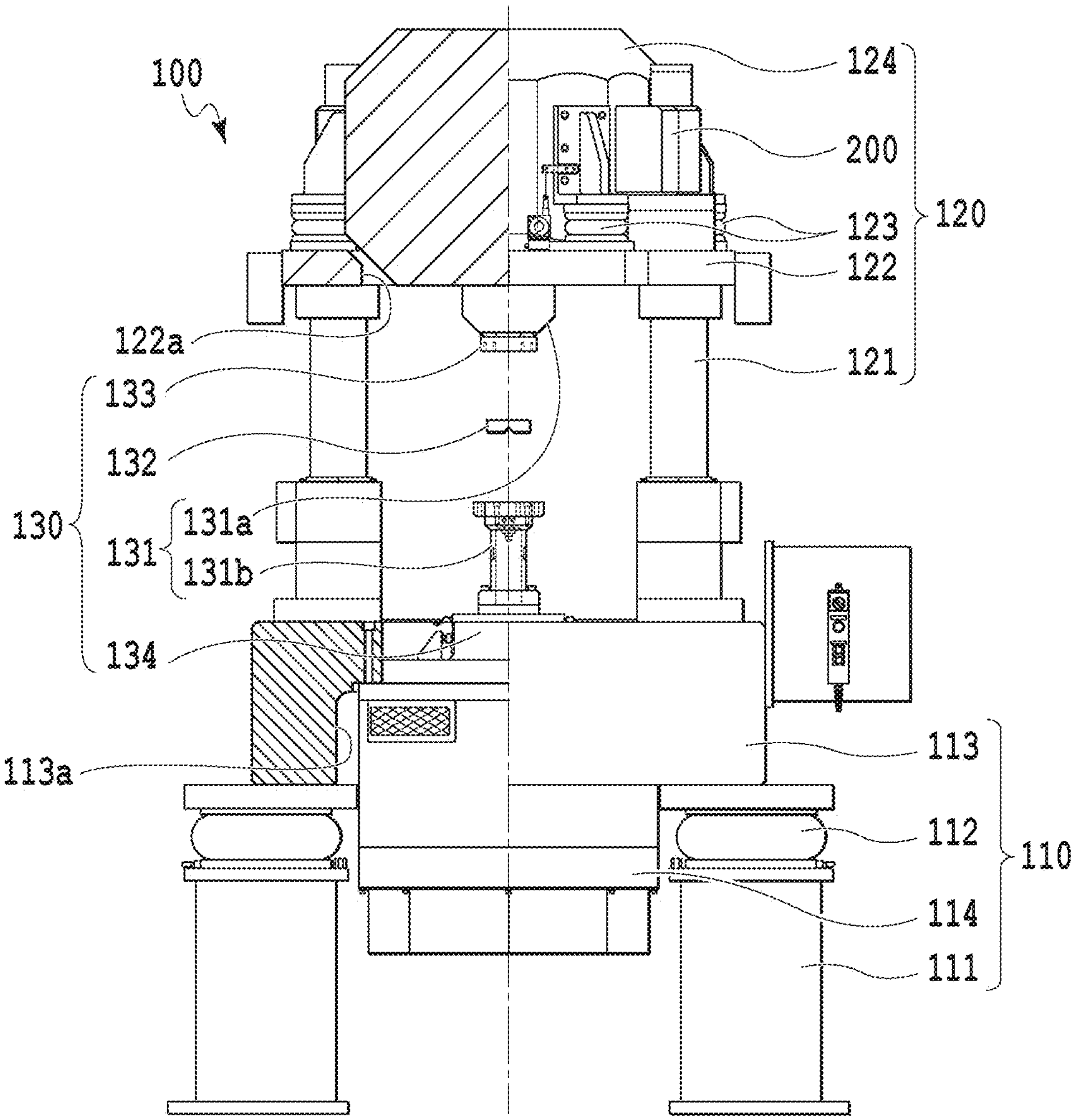
FIG. 1A is a front view including a partial section illustrating an example of a characteristic measuring device according to an embodiment of the present invention.

In the description of the specification and claims, "upper" and "lower" correspond to up and down in FIG. 1A, indicating a relative positional relationship of members and not an absolute positional relationship. The term "air spring" in the description of claims indicates "support-part air spring" in the description of the specification.

<Characteristic Measuring Device>

Figure 1B:
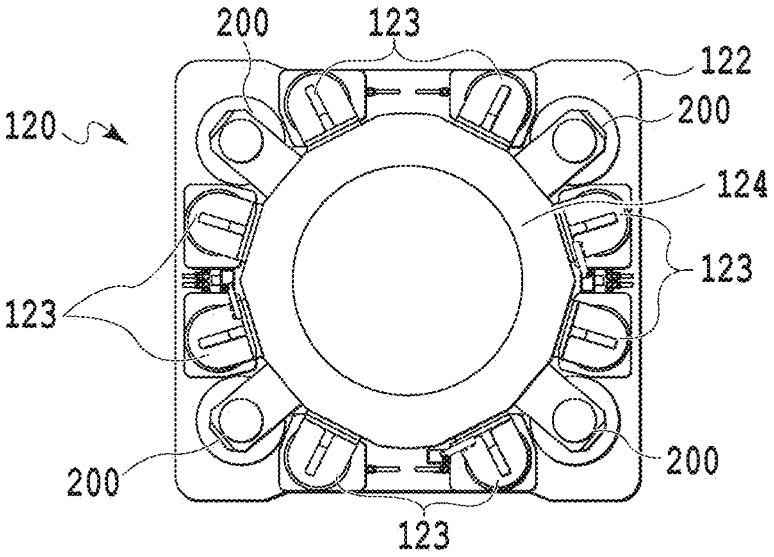
FIG. 1B is a top view illustrating an example of a characteristic measuring device according to an embodiment of the present invention.

An example of a characteristic measuring device 100 according to an embodiment of the present invention will be described with reference to FIGS. 1A and 1B. The left side of the illustrated characteristic measuring device 100 is partially illustrated as a sectional view for the purpose of explanation. The characteristic measuring device 100 is, for example, a measurement device for measuring dynamic nature of an anti-vibration rubber for applications such as for automobiles as standardized in SRIS3503 (The Society of Rubber Industry, Japan Standard).

The characteristic measuring device 100 includes a base part 110, a support part 120, which is mounted on the upper portion of the base part 110 and which supports a reaction-force section 124 that functions as a weight via a support-part air spring (air spring) 123 and a double fastening mechanism 200, in a state such as the floating-mass state and the fixed state, a measurement part 130 arranged between the base part 110 and the support part 120, and a control system (not illustrated). The components of the characteristic measuring device 100 will now be described one by one.

<Base Part>

The base part 110 includes a leg section 111, a base-part air spring 112, a base frame section 113, and an electrodynamic vibration generator 114.

There are four leg sections 111 arranged at positions touching the ground to secure the characteristic measuring device 100 to the ground.

Four base-part air springs 112 are arranged, each of which is an elastic body and mounted on the upper portion of each of four leg sections 111. Providing the base-part air spring 112 makes it possible to prevent vibration to be transmitted between the ground and the characteristic measuring device 100 during a vibration test.

The base frame section 113 has a relatively large mass made of a metal such as iron, and has a substantially square plate shape in plan view and includes, at a center portion, an opening 113*a* that has a diameter that increases stepwise toward the lower portion. The base frame section 113 is installed such that the upper surface of the base frame section 113 becomes horizontal via the base-part air spring 112.

The electrodynamic vibration generator 114 is fixed to the base frame section 113 with its upper portion being contained in the opening 113*a* of the base frame section 113. The electrodynamic vibration generator 114 is electrically connected to the control system and drives an electrodynamic-vibration-generator shaking table 134 installed on the upper portion of the electrodynamic vibration generator 114. With its sufficient mass in addition to the base frame section 113, the electrodynamic vibration generator 114 also serves to prevent vibration transmission as with the base-part air spring 112.

The base part 110 in the embodiment has been described such that the base-part air springs 112 are arranged between four leg sections 111 and the base frame section 113 and the lower portions of the leg sections 111 are secured to the ground. However, this is not a limitation, and for example, the base part 110 may take any form provided that transmission of vibration is prevented, and the base part can tolerate external factors such as an earthquake.

<Support Part>

The support part 120 includes a column 121, a middle surface plate 122, the support-part air spring 123, the double fastening mechanism 200, and the reaction-force section 124.

Four columns 121 are arranged, each of which is fixed to the base frame section 113 at the lower portion, and fixed to the middle surface plate 122 at the upper portion. The column 121 in the embodiment is extendable/contractable in an axial direction, and when extended in an axial direction, for example, it is possible to perform measurement of the measurement part 130 contained in a thermostatic bath and to perform measurement of a large sized test specimen 132.

The middle surface plate 122 has a frame-like shape in plan view, and includes a through portion 122*a* at a center portion. In the middle surface plate 122, the double fastening mechanism 200 is arranged at a corner, and two support-part air springs 123 are arranged along each side that connects corners. The embodiment has been described such that the double fastening mechanism 200 and the support-part air spring 123 are arranged on the corner and the side of the middle surface plate 122 respectively. However, this is not a limitation, and for example, there may be the support-part air spring 123 and the double fastening mechanism 200 arranged on the corner and the side of middle surface plate 122 respectively.

The support-part air spring 123 is an elastic body arranged between the middle surface plate 122 and the reaction-force section 124. The support-part air spring 123 can be placed in the floating-mass state in which vibration caused by resonance or the like is blocked from transmitting between the base part 110 and the reaction-force section 124 under a condition such as high-frequency vibration. In the embodiment, adoption of 8 support-part air springs 123 has been shown for the purpose of explanation. However, this is not a limitation, and any number of support-part air springs 123 may be adopted provided that the floating-mass state can be constituted.

The double fastening mechanism 200 is arranged between the middle surface plate 122 and the reaction-force section 124, and includes two actuators (see a first actuator 210 and a second actuator 220 in FIG. 2), details of which will be described later. In the fixed state, the double fastening mechanism 200 has high rigidity with the base frame section 113, the column 121, the middle surface plate 122, and the reaction-force section 124 being rigidly coupled, and can perform measurement of a static spring constant of the test specimen 132 or measurement at low vibration frequency such as approximately 100 to 150 Hz or less. In the embodiment, adoption of four double fastening mechanisms 200 has been shown for the purpose of explanation. However, this is not a limitation, and any number of double fastening mechanisms 200 may be adopted provided that the fixed state with a sufficient coupling rigidity can be constituted. Here, the double fastening mechanism 200 of the embodiment is capable of holding such that the height position of the reaction-force section 124 is not varied via the double fastening mechanism 200 and the support-part air spring 123 during switching among the floating-mass state, the temporary fixed state, and the fixed state by driving two actuators, details of which will be described later. In this way, the problem of the prior art (pre-load variation) is eliminated, and switching between the floating-mass state and the fixed state can be smoothly achieved.

The reaction-force section 124 functions as a weight, and the lower portion thereof is inserted in the through portion 122*a* of the middle surface plate 122. Since the resonance frequency of the reaction-force section 124 should be at a frequency higher than a measurement range to be measured, the reaction-force section 124 is set to have a relatively large mass (for example, 1500 kg or more).

<Measurement Part>

The measurement part 130 includes paired attachment jigs 131, a test specimen 132, a load washer 133, and an electrodynamic-vibration-generator shaking table 134.

The paired attachment jigs 131 include an upper attachment jig 131*a* installed below the reaction-force section 124 and a lower attachment jig 131*b* installed above the electrodynamic-vibration-generator shaking table 134.

The test specimen 132 is an anti-vibration rubber including a phase element such as an anti-vibration rubber with mass and a liquid-filled anti-vibration rubber for applications such as for automobiles. The test specimen 132 is subjected to measurement while being clamped between the paired attachment jigs 131. Although the test specimen 132 in the embodiment has been described as an anti-vibration rubber for applications such as for automobiles, this is not a limitation, and it may be a general industrial rubber.

The load washer 133 is arranged on the upper side of the test specimen 132 via the upper attachment jig 131*a*. The load washer 133 is a piezoelectric element of high rigidity, and is configured here as a dynamic load instrument for measuring a dynamic load applied to the test specimen 132 for its rapid response speed and a small measurement threshold.

The electrodynamic-vibration-generator shaking table 134 is installed on the upper portion of the electrodynamic vibration generator 114, and is controlled by the control system. A diaphragm (not illustrated) and a coil section (not illustrated) are directly connected to the electrodynamic-vibration-generator shaking table 134, a surrounding AC magnetic field is arranged, and the electrodynamic-vibration-generator shaking table 134 is driven by applying an AC current to the coil. Although the vibration frequency range of the electrodynamic vibration generator 114 in the embodiment is up to 3 kHz, this is not a limitation, and it may be, for example, 3 kHz or more.

<Control System>

Although not illustrated, the control system includes primarily a main controller and a power amplifier housing.

The main controller controls the characteristic measuring device 100 and is connected to a power supply and the characteristic measuring device 100 via a starter and an operating line respectively. The main controller includes primarily a main servo controller, a charge amplifier, a vibration-generator control panel, an uninterruptible power system, a user interface, and the like. Signals indicative of dynamic load, displacement, and the like are input to the main servo controller from various sensors of the characteristic measuring device 100, and various measurement and calculation are performed.

The power amplifier housing is controlled by signals from the vibration-generator control panel of the main controller and, for example, controls operation of the electrodynamic-vibration-generator shaking table 134 of the electrodynamic vibration generator 114 of the characteristic measuring device 100.

<Detailed Configuration of Double Fastening Mechanism>

Detailed configuration of the double fastening mechanism 200 will be described with reference to FIG. 2. The illustrated double fastening mechanism 200 is partially illustrated as a sectional view for the purpose of explanation.

The double fastening mechanism 200 includes the first actuator 210 and the second actuator 220.

<First Actuator>

The first actuator 210 includes a first cylinder 211, a first movable section 212 contained in the first cylinder 211, a first hydraulic oil feeding/discharging path 213, a first biasing means 214 that biases the first movable section 212 downward, a fixing portion 212*g* fixed to the lower end of the first movable section 212 for supporting the lower side of the first biasing means 214.

The first cylinder 211 is a hollow cylindrical member fixed to the upper portion of the middle surface plate 122, and has a stepwise inner circumferential surface extending therethrough along the direction of an axis C. An upper end small-diameter portion 211*a*, a first piston containing portion 211*b*, a lower guide portion 211*c*, and a first spring containing portion 211*d* are continuously formed on the inner circumferential surface from the upper side toward the lower side such that the diameter increases and decreases in a repeated manner. The middle surface plate 122 also has a recess 122*b* formed thereon continuously with the inner circumferential surface of the first cylinder 211.

The first movable section 212 is a hollow cylindrical member contained in the first cylinder 211 and the recess 122*b* of the middle surface plate 122, and includes a through hole 212*a* extending therethrough at a uniform diameter along the direction of the axis C and a stepwise outer circumferential surface. An upper shaft portion 212*b* and a first piston portion 212*c*, which have a diameter that increases sequentially, and a step portion 212*d*, a lower shaft portion 212*e*, and a spring abutting portion 212*f*, which have a diameter that decreases sequentially, are continuously formed on the outer circumferential surface from the upper side toward the lower side.

Here, an arrangement relationship between the first movable section 212 and the first cylinder 211 will be described. First, a gap is formed in a radial direction between the upper shaft portion 212*b* and the upper end small-diameter portion 211*a*. Predetermined gaps are formed in a radial direction between the step portion 212*d* and the first piston containing portion 211*b*, as well as between the spring abutting portion 212*f* and the first spring containing portion 211*d* to define a first closed space S1 and a space for containing the first biasing means 214, respectively, details of which will be described later. Furthermore, minute gaps are formed between the first piston portion 212*c* and the first piston containing portion 211*b*, as well as between the lower shaft portion 212*e* and the lower guide portion 211*c* to allow a relative slide in the direction of the axis C.

The first hydraulic oil feeding/discharging path 213 extends through from the outer circumferential surface to the inner circumferential surface of the first cylinder 211, and makes it possible to supply, discharge, and maintain a drive fluid in the first closed space S1 defined by the first cylinder 211 and the first movable section 212 by being switched between a communicating state in which supply or discharge is enabled and a non-communicating state.

Figure 2:
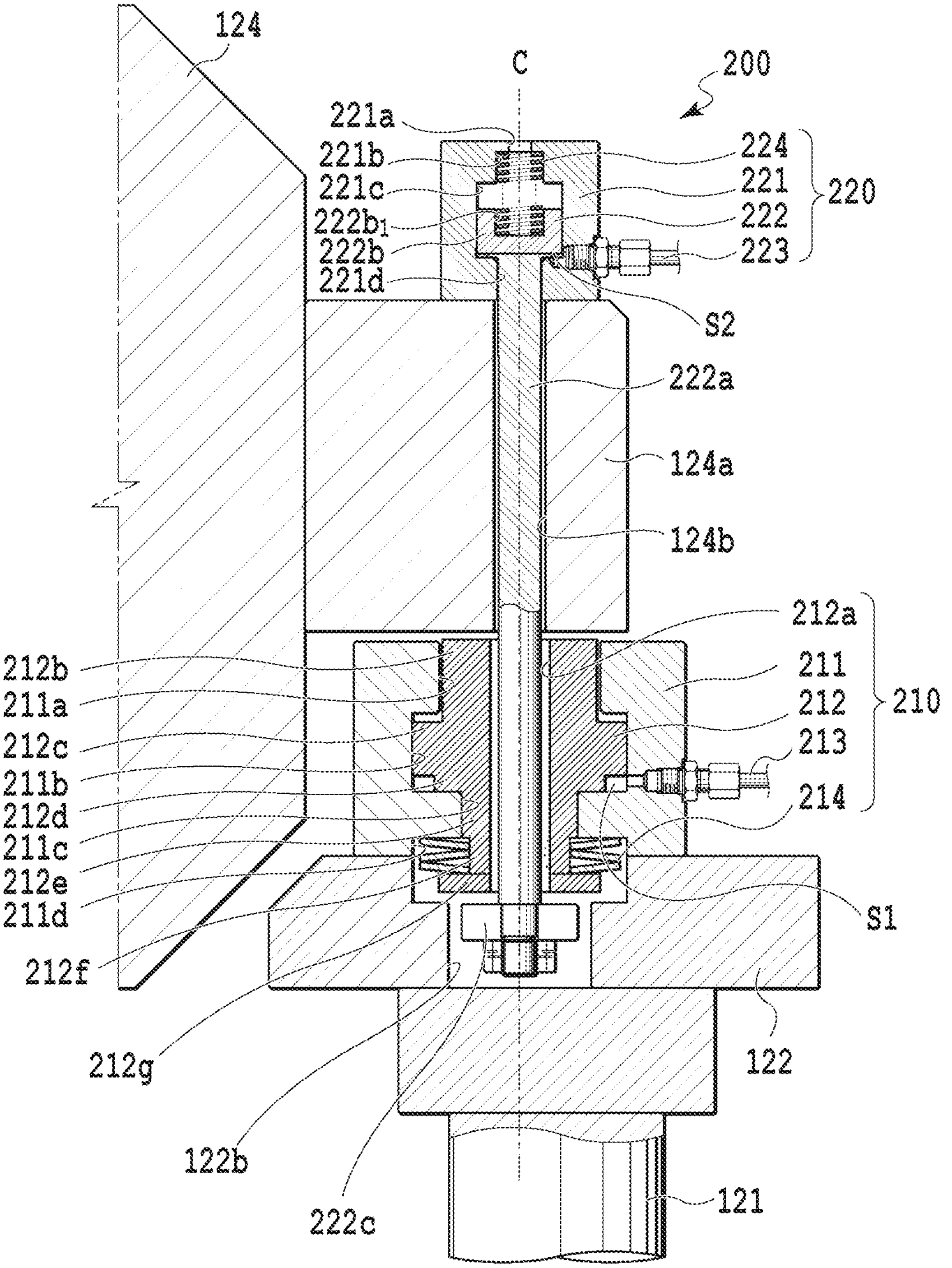
FIG. 2 is an enlarged sectional view of a double fastening mechanism in FIG. 1A.

As illustrated in FIG. 2, without being completely absent, the first closed space S1 is normally in fluid connection with the first hydraulic oil feeding/discharging path 213, so that supply and discharge of hydraulic pressure in the first closed space S1 can be smoothly achieved. By controlling the hydraulic pressure of the drive fluid through the first hydraulic oil feeding/discharging path 213, the first movable section 212 is caused to move to a desired position in the direction of the axis C, so that the first movable section 212 can be brought into contact with and separated from the reaction-force section 124.

The first biasing means 214 is formed of, for example, a belleville spring, is contained in the first spring containing portion 211*d* and the recess 122*b* of the middle surface plate 122, and is clamped in the direction of the axis C by the lower guide portion 211*c* and the fixing member 215 fixed to the lower end portion of the first movable section 212. In this way, the first movable section 212 is normally biased downward by the first biasing means 214. Accordingly, when the first hydraulic oil feeding/discharging path 213 is in the communicating state in which discharge is enabled, the drive fluid is discharged from the first closed space S1, so that the first movable section 212 is arranged at a position where it is spaced apart downward from the reaction-force section 124. On the other hand, when the first hydraulic oil feeding/discharging path 213 is in the communicating state in which supply is enabled, a hydraulic pressure of the drive fluid that is large enough to overcome a resultant force of a biasing force of the first biasing means 214 and the self-weight of the first movable section 212 is supplied to the first closed space S1, so that the first movable section 212 is arranged at a position where it abuts against the reaction-force section 124.

<Second Actuator>

The second actuator 220 includes a second cylinder 221, a second movable section 222 contained in the second cylinder 221, a second hydraulic oil feeding/discharging path 223, a second biasing means 224 that biases the second movable section 222 downward.

The second cylinder 221 is a hollow cylindrical member fixed to the upper portion of a flange portion 124*a* of the reaction-force section 124, and has a stepwise inner circumferential surface extending therethrough along the direction of the axis C. A communicating hole 221*a*, a second spring containing portion 221*b*, and a second piston containing portion 221*c*, which have a diameter that increases sequentially, and a lower end guide portion 221*d*, which has a diameter that decreases, are continuously formed on the inner circumferential surface from the upper side toward the lower side. On the flange portion 124*a* of the reaction-force section 124, an insertion hole 124*b* extending at a uniform diameter along the direction of the axis C is also formed continuously with the inner circumferential surface of the second cylinder 221.

The second movable section 222 is a solid columnar member extending at a uniform diameter along the direction of the axis C, and includes a shaft portion 222*a* inserted in both the insertion hole 124*b* of the flange portion 124*a* and the through hole 212*a* of the first movable section 212, a second piston portion 222*b* that is provided on the upper end of the shaft portion 222*a* with a large diameter and that is contained in the second cylinder 221, and an engagement portion 222*c* that is formed on the lower end of the shaft portion 222*a* with a large diameter and that is contained in the recess 122*b* of the middle surface plate 122.

Here, an arrangement relationship among the second movable section 222, the second cylinder 221, the flange portion 124*a*, and the first movable section 212 will be described. First, minute gaps are formed between the second piston portion 222*b* and the second piston containing portion 221*c*, as well as between the shaft portion 222*a* and the lower end guide portion 221*d* to allow a relative slide in the direction of the axis C. A gap is also formed in a radial direction between the shaft portion 222*a* and the insertion hole 124*b*, as well as between the shaft portion 222*a* and the through hole 212*a*.

The second hydraulic oil feeding/discharging path 223 extends through from the outer circumferential surface of the second cylinder 221 to the inner circumferential surface, and makes it possible to supply, discharge, and maintain the drive fluid in a second closed space S2 defined by the second cylinder 221 and the second movable section 222 by being switched between a communicating state in which supply or discharge is enabled and a non-communicating state. By controlling the hydraulic pressure of the drive fluid through the second hydraulic oil feeding/discharging path 223, the second movable section 222 is caused to move to a desired position in the direction of the axis C, so that the second movable section 222 can be brought into contact with and separated from the first movable section 212.

The second biasing means 224 is formed of, for example, a coil spring, is contained in the second cylinder 221, and is clamped in the direction of the axis C by the second spring containing portion 221*b* and a spring receiving portion 222*b*1 provided on the second piston portion 222*b*. In this way, the second movable section 222 is normally biased downward by the second biasing means 224. Accordingly, when the second hydraulic oil feeding/discharging path 223 is in the communicating state in which discharge is enabled, the drive fluid is discharged from the second closed space S2, so that the engagement portion 222*c* of the second movable section 222 is arranged at a position where it is spaced apart downward from the fixing member 215. On the other hand, when the second hydraulic oil feeding/discharging path 223 is in the communicating state in which supply is enabled, hydraulic pressure of the drive fluid that is large enough to overcome a resultant force of a biasing force of the second biasing means 224 and the self-weight of the second movable section 222 is supplied to the second closed space S2, so that the engagement portion 222*c* of the second movable section 222 is arranged at a position where it abuts against the fixing member 215.

<Operating State of Double Fastening Mechanism>

Figure 3A:
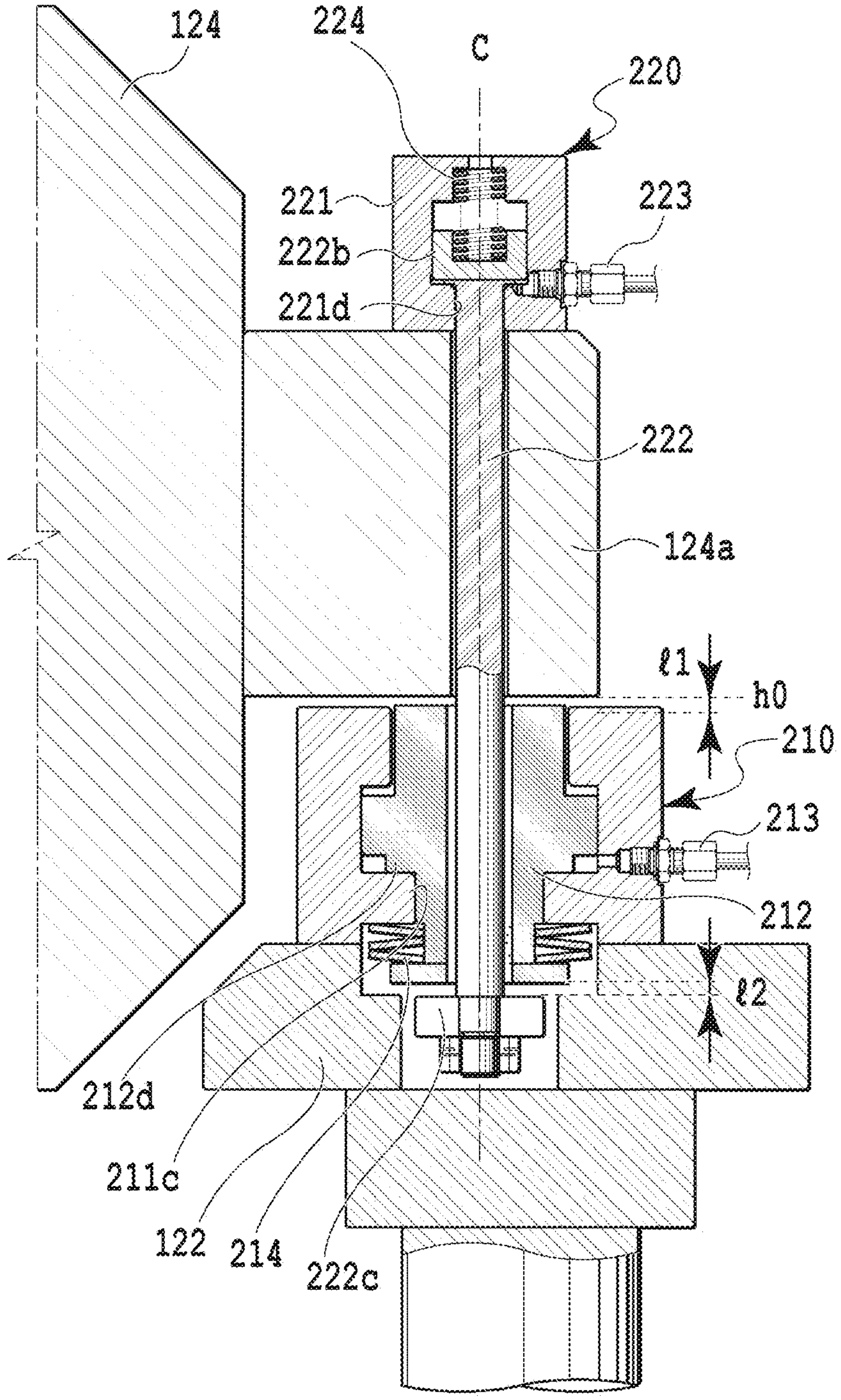
FIG. 3A is a diagram for describing a floating-mass state of the double fastening mechanism in FIG. 2.
Figure 3B:
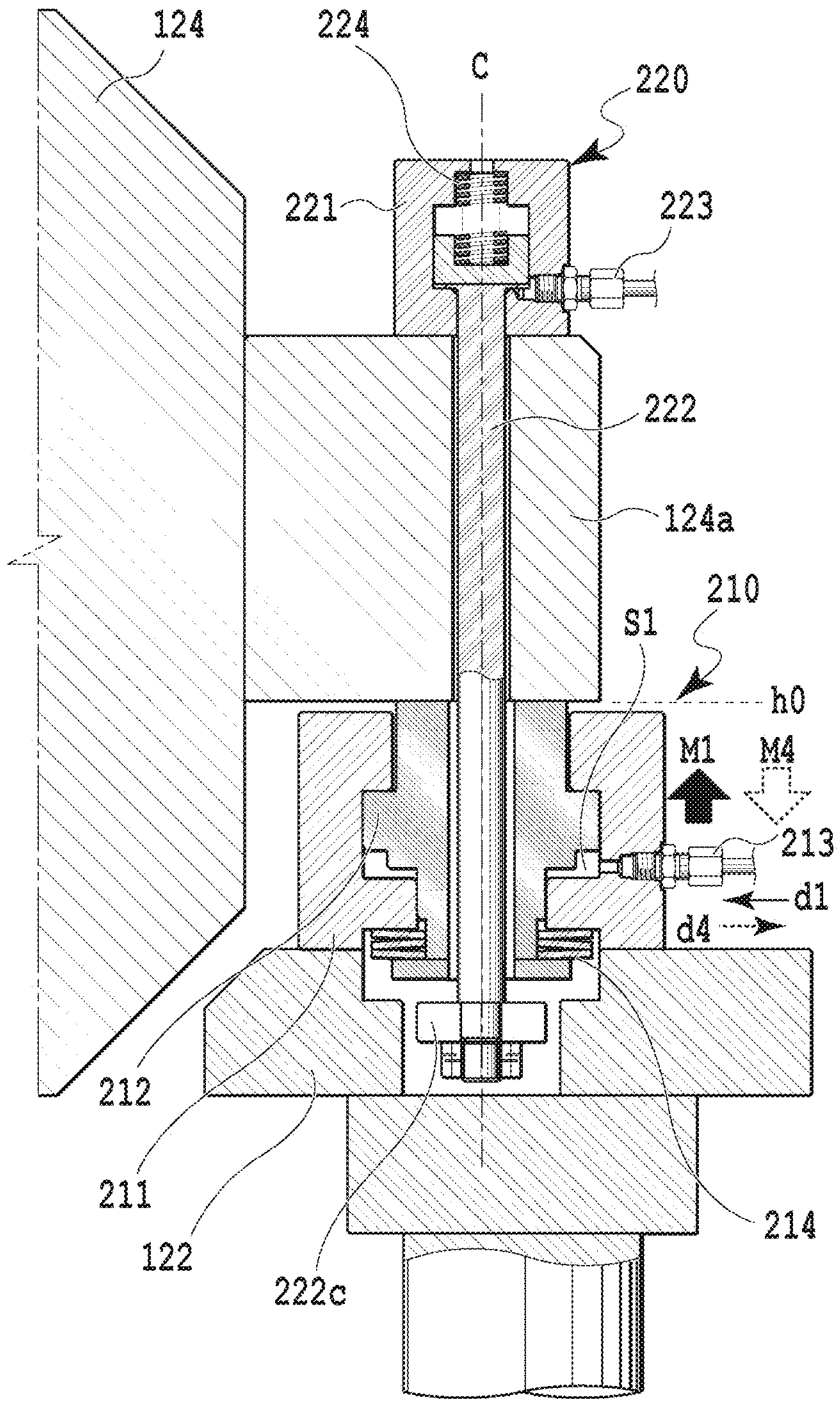
FIG. 3B is a diagram for describing a temporary fixed state of the double fastening mechanism in FIG. 2.
Figure 3C:
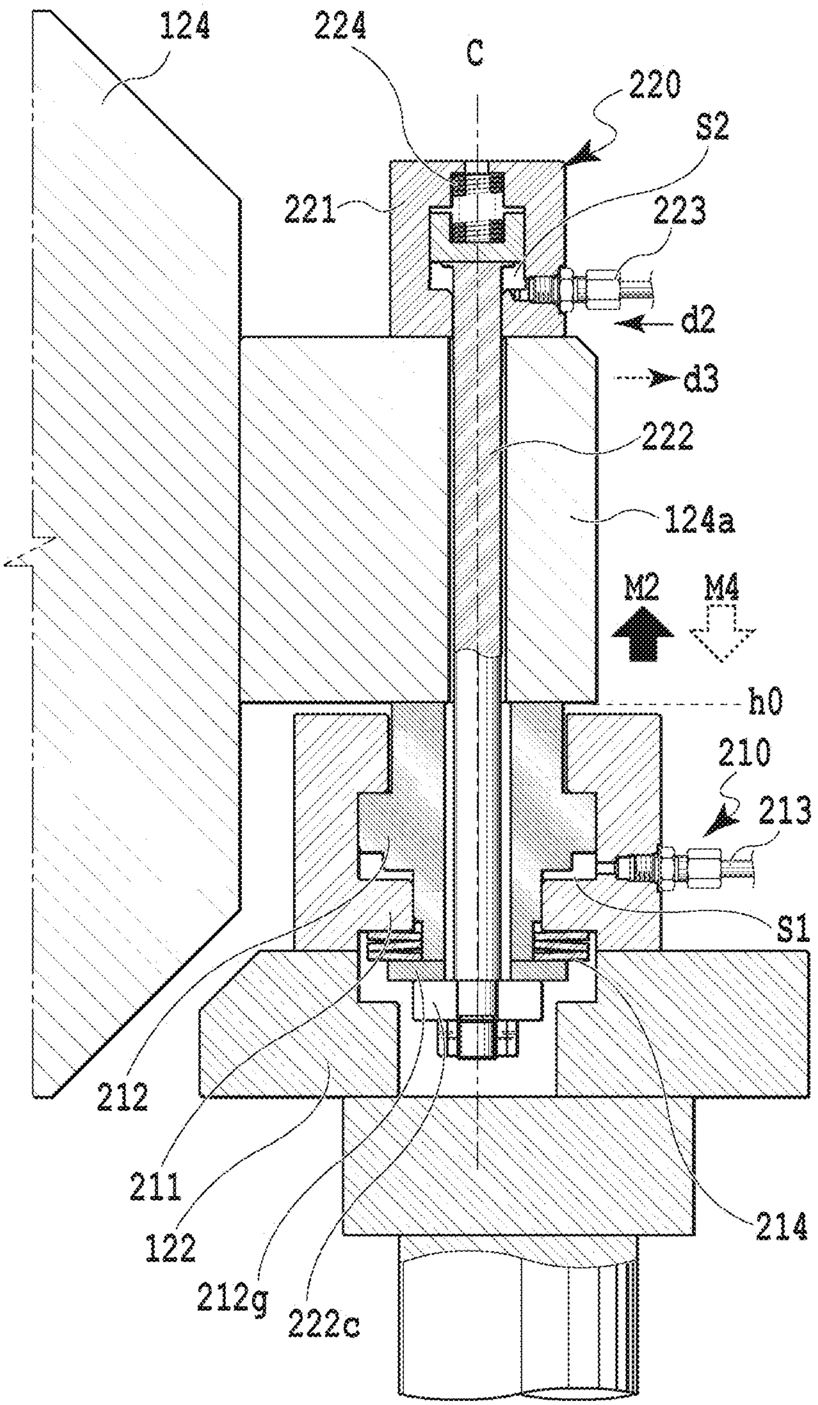
FIG. 3C is a diagram for describing a fixed state of the double fastening mechanism in FIG. 2.

Operating state of the double fastening mechanism 200 will be described with reference to FIGS. 3A to 3C. The illustrated reference height h0 indicates a height of the lower surface of the flange portion 124*a* of the reaction-force section 124, indicating that there is no variation of reaction-force section 124 in the up-down direction in any state of the floating-mass state, the temporary fixed state, and the fixed state.

<When Transition is Made in Order of Floating-Mass State, Temporary Fixed State, and Fixed State>

First, the double fastening mechanism 200 in the floating-mass state will be described. As illustrated in FIG. 3A, the first actuator 210 is placed in a state in which the drive oil in the first closed space S1 can be discharged through the first hydraulic oil feeding/discharging path 213. Accordingly, the first movable section 212 is biased downward by the first biasing means 214, and the lower surface of the step portion 212*d* of the first movable section 212 is held at a position where it abuts against the upper surface of the lower guide portion 211*c* of the first cylinder 211. Similarly, the second actuator 220 is placed in a state in which the drive oil in the second closed space S2 can be discharged through the second hydraulic oil feeding/discharging path 223. Accordingly, the second movable section 222 is biased downward by the second biasing means 224, and the lower surface of the second piston portion 222*b* of the second movable section 222 is held at a position where it abuts against the upper surface of the lower end guide portion 221*d* of the second cylinder 221.

In this way, the first movable section 212 is spaced apart from the flange portion 124*a* of the reaction-force section 124 in the direction of the axis C by the distance 11, and the first movable section 212 is spaced apart from the engagement portion 222*c* of the second movable section 222 in the direction of the axis C by the distance 12. Accordingly, the reaction-force section 124 is not supported by the first actuator 210 and the second actuator 220, being kept in the floating-mass state. In the floating-mass state, the first hydraulic oil feeding/discharging path 213 and the second hydraulic oil feeding/discharging path 223 are in a state in which the drive oil can be discharged or in a non-communicating state.

Next, the double fastening mechanism 200 making a transition from the floating-mass state to the temporary fixed state will be described. As illustrated in FIG. 3B, in the first actuator 210, the drive oil is supplied to the first closed space S1 through the first hydraulic oil feeding/discharging path 213 (see an arrow d1 in the FIGURE), and the first movable section 212 moves upward contrary to the first biasing means 214 (see an arrow M1 in the FIGURE). Thereafter, at a position where the first movable section 212 abuts against the flange portion 124*a* of the reaction-force section 124, the supply of the drive oil is stopped. At this time, since the amount of supply of the drive oil to the first actuator 210 is controlled such that the first movable section 212 makes a soft landing on the reaction-force section 124, the reaction-force section 124 will not vary upward before and after the abutment is made. On the other hand, in the second actuator 220, the drive oil is not supplied to the second closed space S2 through the second hydraulic oil feeding/discharging path 223, so that the second movable section 222 will not move.

In this way, the reaction-force section 124 is in the temporary fixed state in which it is supported from below only by the first actuator 210. In the temporary fixed state, the first hydraulic oil feeding/discharging path 213 is in a non-communicating state, while the second hydraulic oil feeding/discharging path 223 is in a state in which the drive oil can be discharged or in a non-communicating state.

Furthermore, the double fastening mechanism 200 making a transition from the temporary fixed state to the fixed state will be described. As illustrated in FIG. 3C, in the first actuator 210, the drive oil is not supplied to the first closed space S1 through the first hydraulic oil feeding/discharging path 213, so that the first movable section 212 will not move. On the other hand, in the second actuator 220, the drive oil is supplied to the second closed space S2 through the second hydraulic oil feeding/discharging path 223 (see an arrow d2 in the FIGURE), and the second movable section 222 moves upward contrary to the second biasing means 224 (see an arrow M2 in the FIGURE). Thereafter, at a position where the engagement portion 222*c* of the second movable section 222 abuts against the fixing portion 212*g* of the first movable section 212, the supply of the drive oil is stopped. At this time, the second movable section 222 is fixed to the reaction-force section 124 in the direction of the axis C via the first movable section 212, so that the middle surface plate 122, to which the first actuator 210 is fixed, and the reaction-force section 124, to which the second actuator 220 is fixed, can be rigidly fastened and fixed.

In this way, the reaction-force section 124 is in the fixed state in which it is rigidly fastened and fixed from below by the first actuator 210 and the second actuator 220. In the fixed state, the first hydraulic oil feeding/discharging path 213 and the second hydraulic oil feeding/discharging path 223 are in a non-communicating state.

<When Transition is Made in Order of Fixed State, Temporary Fixed State, and Floating-Mass State>

Descriptions overlapping with those described above regarding the double fastening mechanism 200 when a transition is made in order of the floating-mass state, the temporary fixed state, and the fixed state will not be repeated.

First, the double fastening mechanism 200 making a transition from the fixed state to the temporary fixed state will be described. As illustrated in FIG. 3C, in the first actuator 210, the first hydraulic oil feeding/discharging path 213 is in a non-communicating state, so that the first movable section 212 will not move. On the other hand, the second actuator 220 is placed in a state in which the drive oil in the second closed space S2 can be discharged through the second hydraulic oil feeding/discharging path 223 (see an arrow d3 in the FIGURE), so that the second movable section 222 moves downward by being biased by the second biasing means 224 (see an arrow M3 in the FIGURE). Thereafter, at a position where the engagement portion 222*c* of the second movable section 222 is spaced apart from the first movable section 212, the discharge of the drive oil is stopped.

Next, the double fastening mechanism 200 making a transition from the temporary fixed state to the floating-mass state will be described. As illustrated in FIG. 3B, the first actuator 210 is placed in a state in which the drive oil in the first closed space S1 can be discharged through the first hydraulic oil feeding/discharging path 213 (see an arrow d4 in the figure), so that the first movable section 212 moves downward by being biased by the first biasing means 214 (see an arrow M4 in the FIGURE). Thereafter, at a position where the first movable section 212 is spaced apart from the flange portion 124*a* of the reaction-force section 124, the discharge of the drive oil is stopped.

Furthermore, the double fastening mechanism 200 in the floating-mass state will be described. As illustrated in FIG. 3A, since the first actuator 210 and the second actuator 220 are not supplied with the drive oil, the first movable section 212 and the second movable section 222 will not move.

In this way, in the temporary fixed state and the fixed state, the reaction-force section 124 is supported by and fixed to the middle surface plate 122 while maintaining the height position of the reaction-force section 124 in the floating-mass state. Accordingly, the reaction-force section 124 will not move in the up-down direction while returning to the floating-mass state.

Figure 5A:
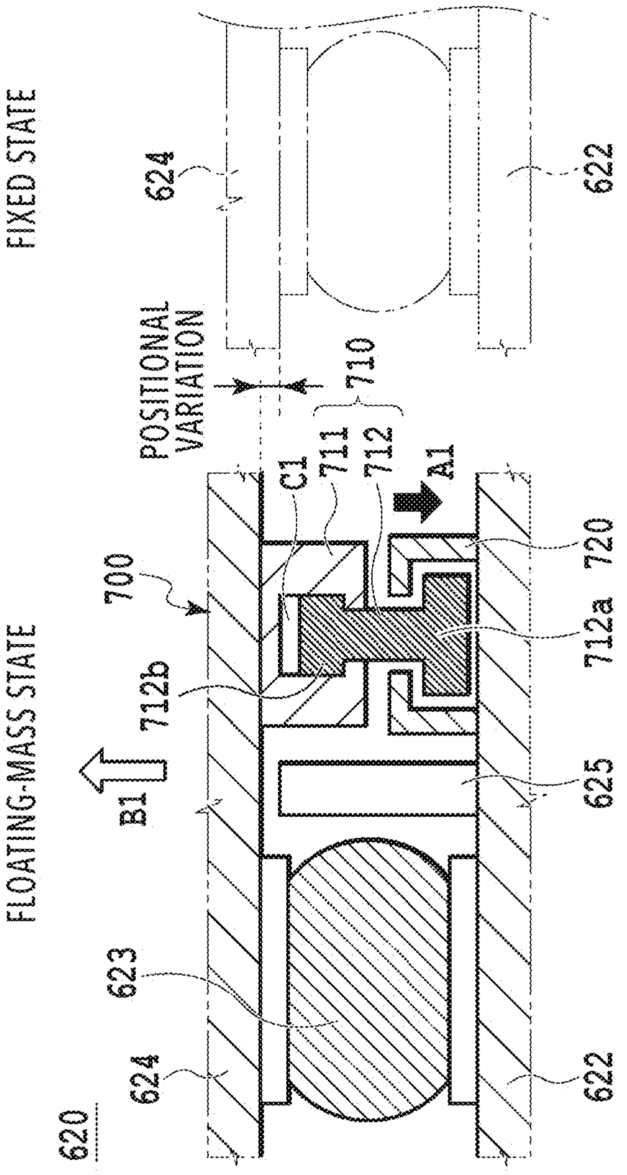
FIG.5A PRIOR ART
FIG. 5A is an enlarged sectional view of a fastening mechanism and an air spring used in a prior-art characteristic measuring device in the floating-mass state.
Figure 5B:
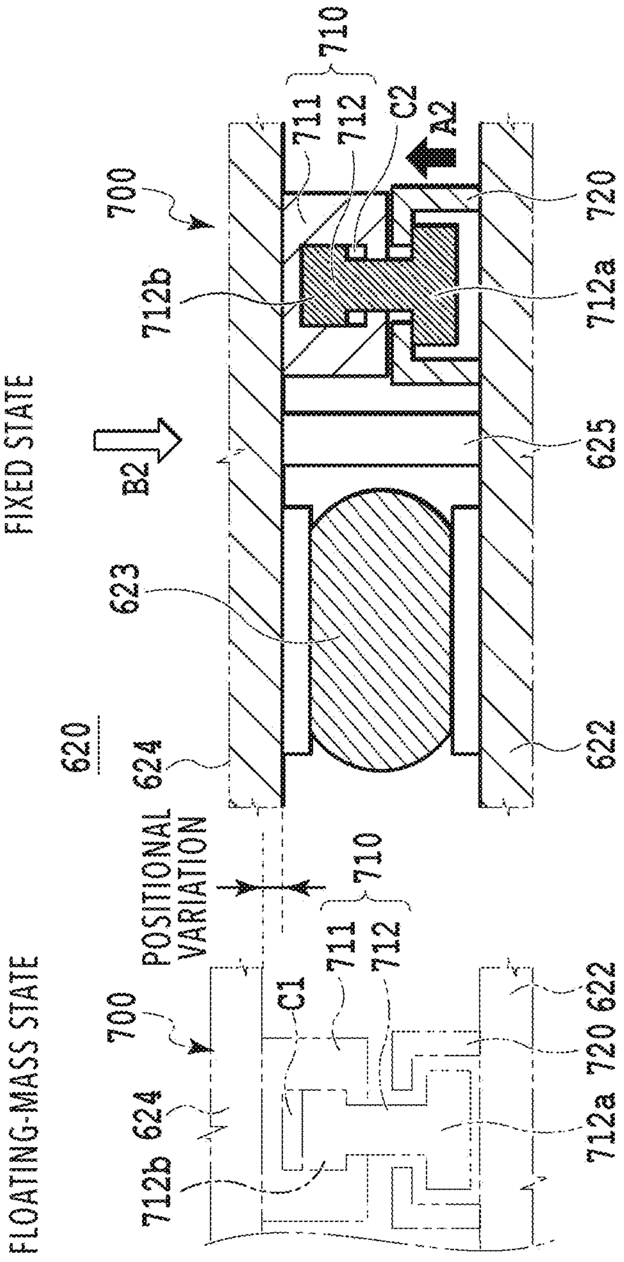
FIG.5B PRIOR ART
FIG. 5B is an enlarged sectional view of the fastening mechanism and the air spring used in the prior-art characteristic measuring device in the fixed state.

As described above, the double fastening mechanism 200 of the embodiment is capable of holding such that the height position of the reaction-force section 124 (see the reference height h0 in FIGS. 3A to 3C) is not varied via the double fastening mechanism 200 and the support-part air spring 123 during switching among the floating-mass state, the temporary fixed state, and the fixed state by driving the first actuator 210 and the second actuator 220. In this way, the problem of the prior art (pre-load variation) is eliminated, and switching between the floating-mass state and the fixed state can be smoothly achieved. Furthermore, since a compressive force in the up-down direction loaded on the support-part air spring 123 of the embodiment does not vary in the floating-mass state, the temporary fixed state, and the fixed state, it is possible to avoid occurrence of air leakage or the like due to a rapid increase in the internal pressure of the support-part air spring 123 during switching from one state to another. Furthermore, in contrast to the prior-art fastening mechanism 700 (see FIGS. 5A and 5B), the double fastening mechanism 200 in the embodiment adopts the temporary fixed state. Accordingly, it is possible to avoid occurrence of a rapid variation in the reaction-force section 124 by increasing a supporting force stepwise from the supportless floating-mass state, to the temporary fixed state in which a soft landing is made to support from below, and to the fixed state in which rigid fastening and fixation are made from below relative to the reaction-force section 124, or conversely, by decreasing the supporting force stepwise from the fixed state, to the temporary fixed state, and to the floating-mass state.

<Reaction-Force-Section Height-Holding Means>

As previously described, by adopting the double fastening mechanism 200 in place of the prior-art fastening mechanism 700 (see FIGS. 5A and 5B), the characteristic measuring device 100 of the embodiment can satisfactorily eliminate the problem of the prior art (pre-load variation) and achieve smooth switching between the floating-mass state and the fixed state without causing the height position of the reaction-force section 124 to be varied. Moreover, the inventors have conducted a further study on the behavior of the reaction-force section 124 in the up-down direction when the double fastening mechanism 200 is adopted. As a result, it has been found that, particularly when switched from the fixed state (see FIG. 3C) to the floating-mass state (see FIG. 3A), the height position of the reaction-force section 124 may vary slightly below the desired reference height h0, which may result from the air tightness of the support-part air spring 123. Specifically, this may occur because, in the fixed state, the support-part air spring 123 is kept compressed for a long time, causing a small amount of air leakage, and thereafter, in the floating-mass state, the support-part air spring 123 alone supports the reaction-force section 124.

Figure 4:
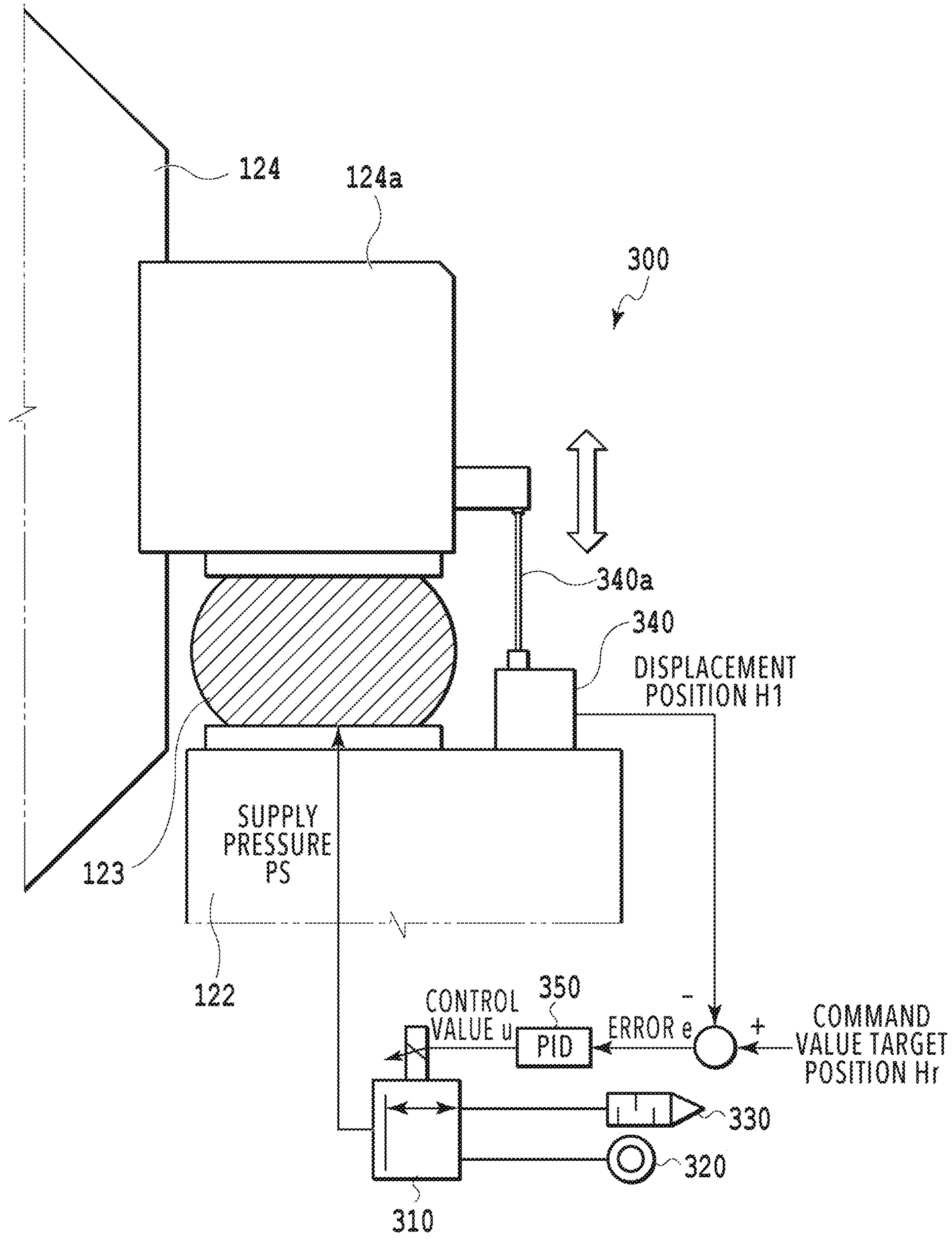
FIG. 4 is a diagram for describing a reaction-force-section height-holding means in the characteristic measuring device in FIG. 1A.

To solve the new problem (hereinafter referred to as "reaction-force section variation in the floating-mass state"), as illustrated in FIG. 4, a reaction-force-section height-holding means 300 is adopted in the support part 120 in addition to the double fastening mechanism 200. Here, while in FIG. 4, one support-part air spring 123 is illustrated, which is provided with one reaction-force-section height-holding means 300 for the convenience of explanation, other support-part air springs 123 are also provided with a similar reaction-force-section height-holding means 300.

The reaction-force-section height-holding means 300 includes a proportional pressure control valve 310, a pressure source 320, a silencer 330, a displacement detector 340, and a PID control section 350. The components of the reaction-force-section height-holding means 300 will now be described one by one.

The proportional pressure control valve 310 steplessly adjust a supply pressure PS in accordance with a control value u from the outside, and is in fluid connection with the pressure source 320 that supplies compressed air at high pressure (0.4 MPa or more) and the silencer 330 that exhausts silently into the external environment on one side, and is in fluid connection with the support-part air spring 123 on the other side.

The displacement detector 340 is a draw-wire displacement sensor that includes a wire section 340*a*. The upper end of the wire section 340*a* is fixed to the flange portion 124*a* of the reaction-force section 124, and the displacement detector 340 outputs a displacement position H1, which is a displacement signal corresponding to extension/contraction of the wire section 340*a*. Although the displacement detector 340 in the embodiment is a contact-type displacement sensor, this is not a limitation, and for example, a non-contact displacement sensor (for example, a laser displacement sensor) or the like may be adopted.

The PID control section 350 combines a proportional control, an integral control, and a derivative control, and calculates a control value u from three values: an error e between the displacement position H1 and a target position Hr, and an integral and a derivative thereof, to control the supply pressure PS. By using the PID control section 350 to control the supply pressure PS, it is possible to cause the displacement position H1 of the reaction-force section 124 to reach the target position Hr stably and rapidly while suppressing an overshoot.

<Operation of Reaction-Force-Section Height-Holding Means>

The reaction-force-section height-holding means 300 is configured to operate particularly during switching from the temporary fixed state to the floating-mass state and while in the floating-mass state, during which the height position of the reaction-force section 124 may vary.

Here, when the displacement position H1 is lower than the target position Hr, the PID control section 350 controls the proportional pressure control valve 310 to increase the supply pressure PS. As a result, the internal pressure of the support-part air spring 123 increases and the reaction-force section 124 moves upward toward the target position Hr (see an upward arrow in FIG. 4). On the other hand, when the displacement position H1 is higher than the target position Hr, the PID control section 350 controls the proportional pressure control valve 310 to decrease the supply pressure PS. As a result, the internal pressure of the support-part air spring 123 decreases and the reaction-force section 124 moves downward toward the target position Hr (see a downward arrow in FIG. 4).

In this way, the reaction-force-section height-holding means 300 of the embodiment controls the supply pressure PS to the support-part air spring 123 during switching from the temporary fixed state to the floating-mass state and while in the floating-mass state, so that the displacement position H1 of the reaction-force section 124 can be caused to reach the target position Hr stably and rapidly. Accordingly, the new problem (reaction-force section variation in the floating-mass state) can be eliminated and switching between the floating-mass state and the fixed state can be more smoothly achieved.

Although the reaction-force-section height-holding means 300 in the embodiment is configured to operate at least in the floating-mass state (during switching from the temporary fixed state to the floating-mass state and while in the floating-mass state), this is not a limitation, and for example, may be configured to operate normally (in the floating-mass state, the temporary fixed state, and the fixed state).

<Conclusion>

The present invention is not limited to the embodiment described above, and alteration and variation may be made thereto as appropriate without departing from the technical idea of the present invention.

REFERENCE SIGNS LIST

100: characteristic measuring device
110: Base part
111: Leg section
112: Base-part air spring
113: Base frame section
114: Electrodynamic vibration generator
120: Support part
121: Column
122: Middle surface plate
122*a*: Through portion
122*b*: Recess
123: Support-part air spring (air spring)
124: Reaction-force section
124*a*: Flange portion
124*b*: Insertion hole
130: Measurement part
131: Paired attachment jigs
131*a*: Upper attachment jig
131*b*: Lower attachment jig
132: Test specimen
133: Load washer
134: Electrodynamic-vibration-generator shaking table
200: Double fastening mechanism
210: First actuator
211: First cylinder
211*a*: Upper end small-diameter portion

211*b*: First piston containing portion
211*c*: Lower guide portion
211*d*: First spring containing portion
212: First movable section
212*a*: Through hole
212*b*: Upper shaft portion
212*c*: First piston portion
212*d*: Step portion
212*e*: Lower shaft portion
212*f*: Spring abutting portion
212*g*: Fixing portion
213: First hydraulic oil feeding/discharging path
214: First biasing means
212*a*: Through hole
220: Second actuator
221: Second cylinder
221*a*: Communicating hole
221*b*: Second spring containing portion
221*c*: Second piston containing portion
221*d*: Lower end guide portion
222: Second movable section
222*a*: Shaft portion
222*b*: Second piston portion
222*b*1: Spring receiving portion
222*c*: Engagement portion
223: Second hydraulic oil feeding/discharging path
224: Second biasing means
300: Reaction-force-section height-holding means
310: Proportional pressure control valve
320: Pressure source
330: Silencer
340: Displacement detector
340*a*: Wire section
350: PID control section
C: Axis
e: Error
H1: Displacement position
Hr. Target position
h0: Reference height
11: Separation between first movable section and flange portion of reaction-force section
12: Separation between first movable section and engagement portion of second movable section
PS: Supply pressure
S1: First closed space
S2: Second closed space
u: Control value

The invention claimed is:

1. A characteristic measuring device comprising:
a base part;
a support part mounted on an upper portion of the base part; and
a measurement part arranged between the base part and the support part, with a test specimen being attached to the measurement part, wherein
the support part includes: a middle surface plate fixed to the base part; a reaction-force section that functions as a weight; and an air spring and a double fastening mechanism each arranged between the middle surface plate and the reaction-force section,
the air spring and the double fastening mechanism support the reaction-force section such that a height of the reaction-force section is not varied in both a floating-mass state and a fixed state to maintain a predetermined pre-load to the test specimen, and
the double fastening mechanism includes: a first actuator fixed to the reaction-force section; and a second actuator fixed to the middle surface plate, and wherein
the reaction-force section is not supported by the first actuator and the second actuator in the floating-mass state and supported by the first actuator and the second actuator in the fixed state.

2. The characteristic measuring device according to claim 1, wherein
the first actuator includes a first movable section that is contactable with and separable from a lower surface of the reaction-force section,
the second actuator includes a second movable section that passes through the reaction-force section and the first movable section, the second movable section including an engagement portion that is contactable with and separable from a lower end of the first movable section, and wherein
in the floating-mass state, an upper end and the lower end of the first movable section are spaced apart in an axial direction from the reaction-force section and the second movable section respectively, and
in the fixed state, the upper end and the lower end of the first movable section are in abutment against the reaction-force section and the second movable section respectively.

3. The characteristic measuring device according to claim 1, further comprising a reaction-force-section height-holding means that includes a displacement detector configured to measure displacement of the reaction-force section at least in the floating-mass state, the reaction-force-section height-holding means being configured to control supply pressure to the air spring based on a displacement signal measured by the displacement detector.

4. The characteristic measuring device according to claim 1, wherein
in a temporary fixed state between the floating-mass state and the fixed state, the air spring and the double fastening mechanism support the reaction-force section such that the height of the reaction-force section is not varied, and
the reaction-force section is supported by only the first actuator in the temporary fixed state.

5. The characteristic measuring device according to claim 4, wherein
the first actuator includes a first movable section that is contactable with and separable from the lower surface of the reaction-force section, and
the second actuator includes a second movable section that passes through the reaction-force section and the first movable section, the second movable section including an engagement portion that is contactable with and separable from the lower end of the first movable section, and wherein
in the temporary fixed state, by causing the upper end of the first movable section to abut against the reaction-force section and causing the lower end of the first movable section to be spaced apart from the second movable section, the reaction-force section is supported such that the height of the reaction-force section is not varied relative to the middle surface plate.

* * * * *